Aug. 22, 1933.     C. WARNER     1,923,600
GAS PRODUCING APPARATUS
Filed May 30, 1930     7 Sheets-Sheet 1

INVENTOR
Clarence Warner
BY
Spencer, Hardman and John
ATTORNEY

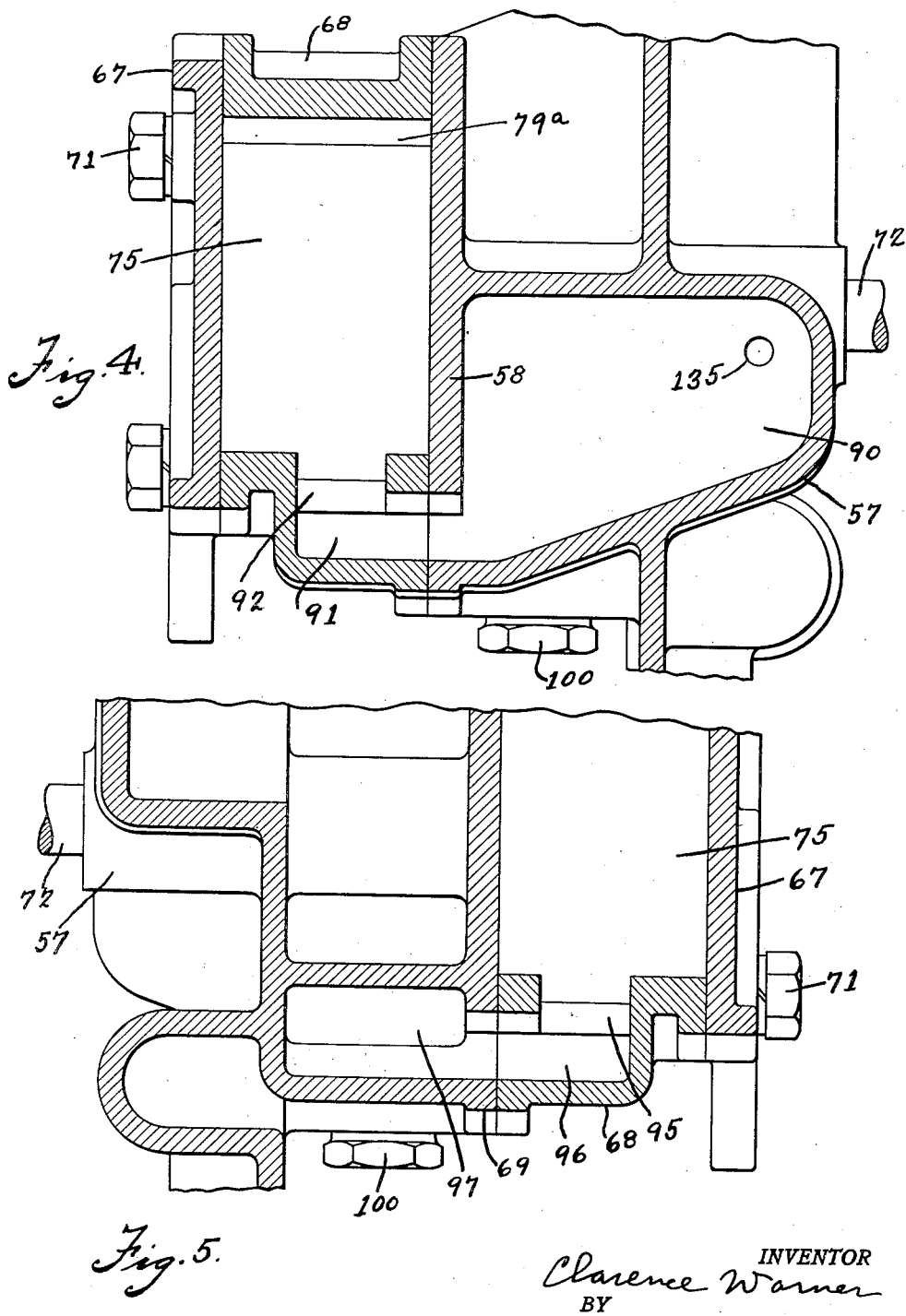

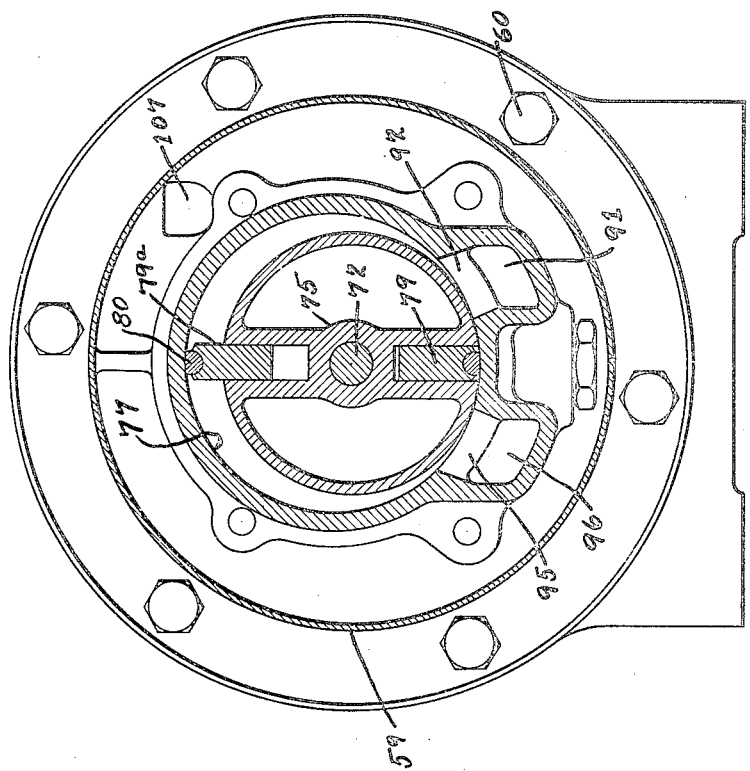
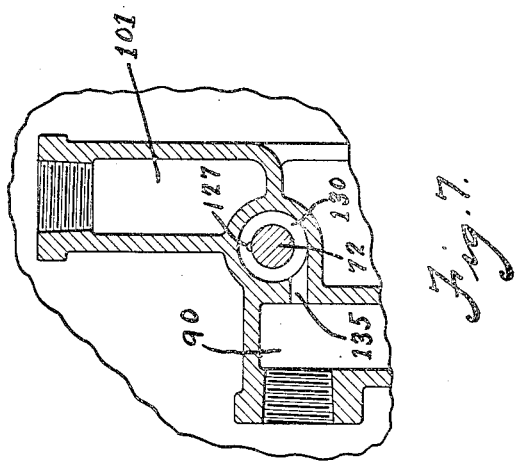

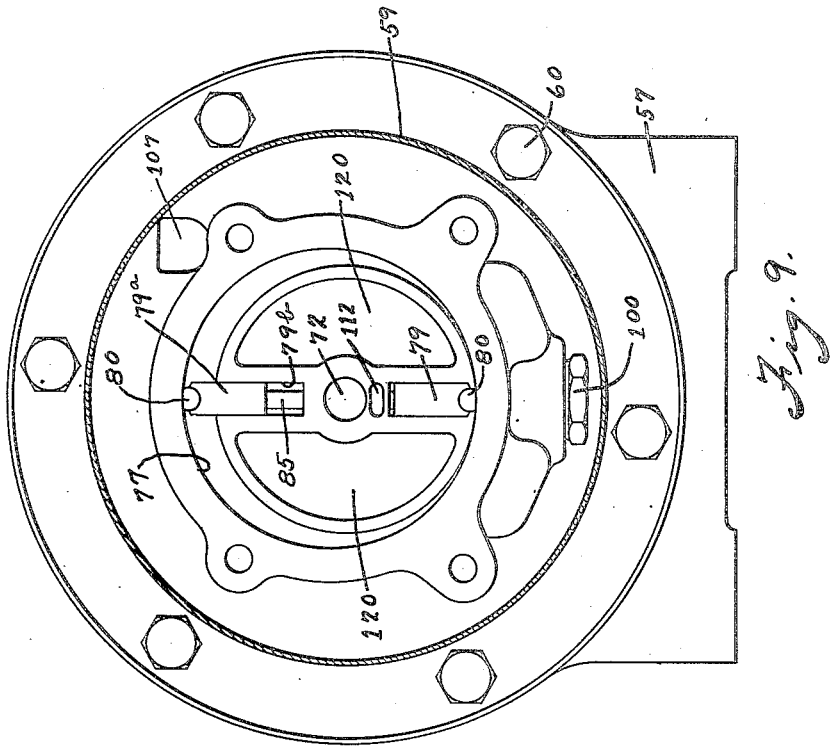
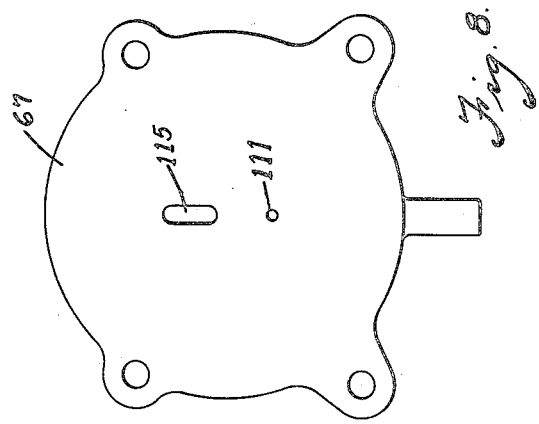

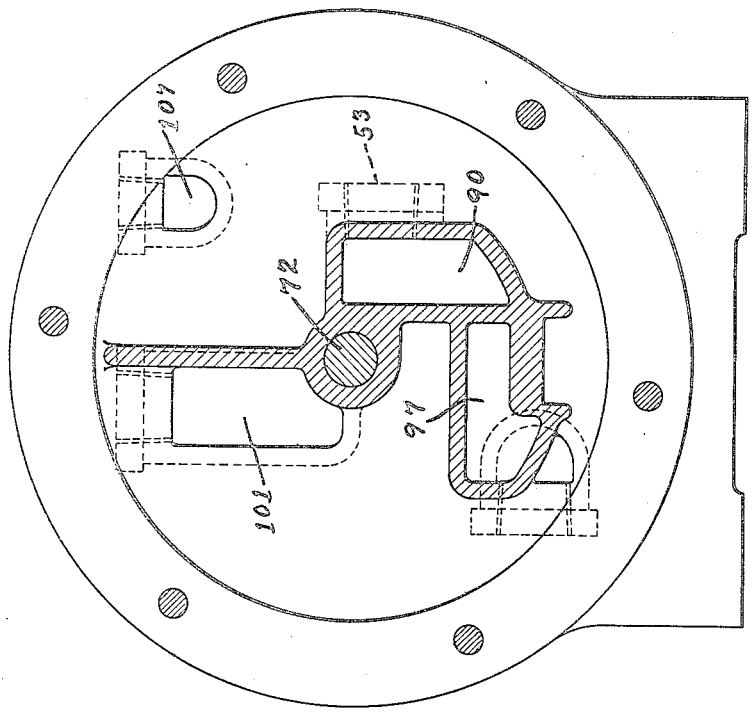
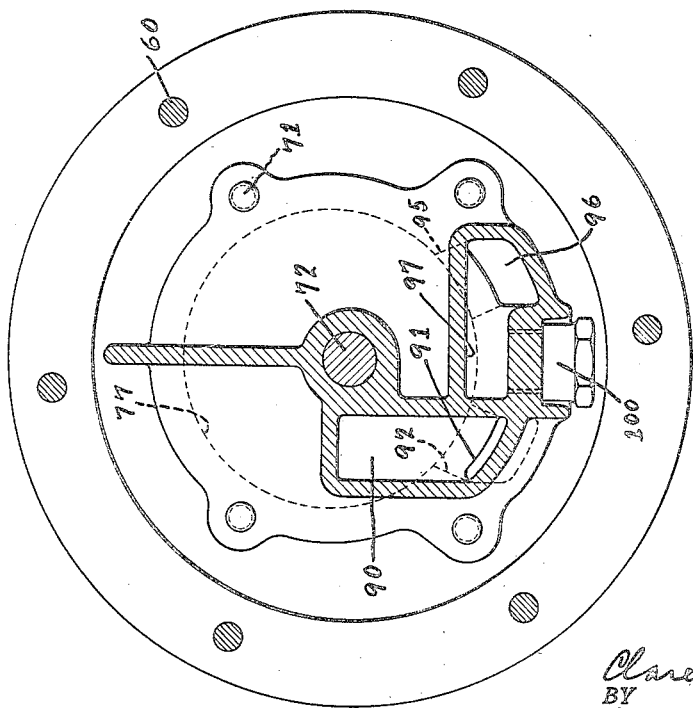

Patented Aug. 22, 1933

1,923,600

UNITED STATES PATENT OFFICE 1,923,600

GAS PRODUCING APPARATUS

Clarence Warner, Dayton, Ohio, assignor to Delco-Light Company, Rochester, N. Y., a Corporation of Delaware Application May 30, 1930. Serial No. 457,588

5 Claims. (Cl. 230—207)

This invention relates to gas producing apparatus and more particularly to a compressing device for such apparatus.

One of the objects of the present invention is to provide an improved compressing device for maintaining a gas under predetermined pressure limits in a gas producing apparatus.

Another object of the present invention is to provide an improved arrangement for supplying lubricant to the moving elements of the aforesaid compressing device during the operation thereof.

Further objects and advantages of the present invention will be apparent from the following description, reference being had to the accompanying drawings, wherein a preferred form of the present invention is clearly shown.

In the drawings:

Fig. 4 is a fragmentary view in cross section taken in the direction of the arrows 4—4 of Fig. 2;

Fig. 5 is a fragmentary view in cross section taken in the direction of the arrows 5—5 of Fig. 2;

Fig. 6 is a view in cross section taken along the line 6—6 of Fig. 3;

Fig. 7 is a fragmentary view in cross section taken in the direction of the arrows 7—7 of Fig. 3;

Fig. 8 is a view taken in the direction of the arrows 8—8 of Fig. 3;

Fig. 9 is a view taken in the direction of the arrows 9—9 of Fig. 3;

Fig. 10 is a view in cross section taken in the direction of the arrows 10—10 in Fig. 3; and Fig. 11 is a view in cross section taken in the direction of the arrows 11—11 of Fig. 3.

Figure 1:
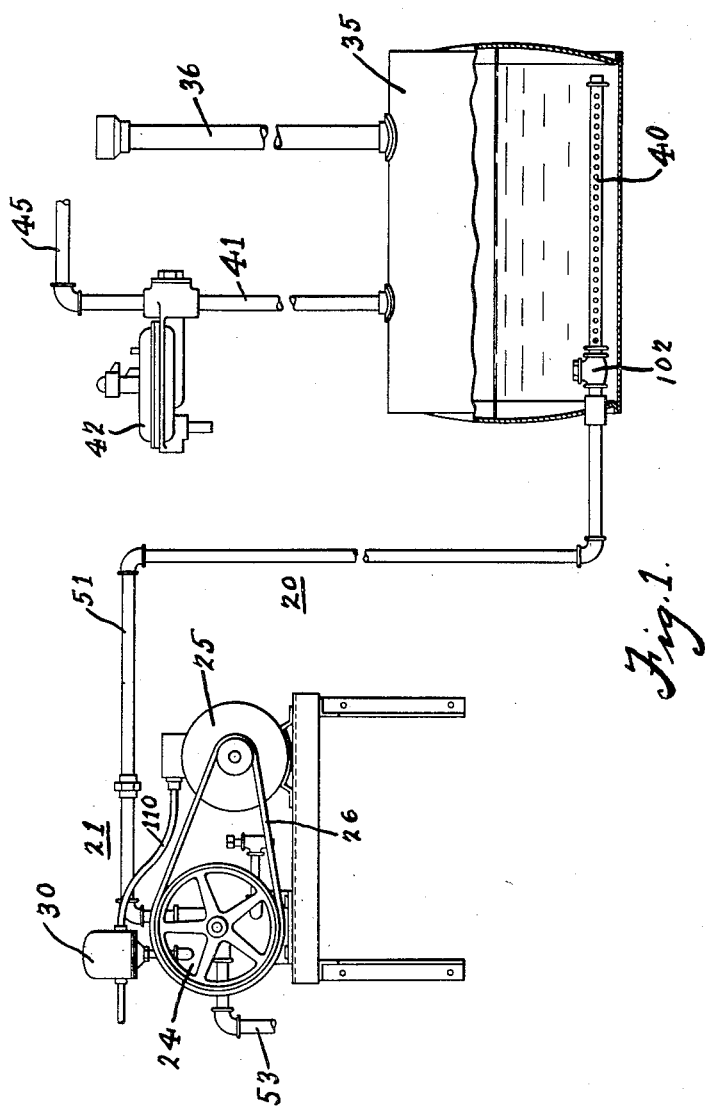
Fig. 1 is a side view in elevation, partly broken away, of a system embodying features of this invention.
Figure 2:
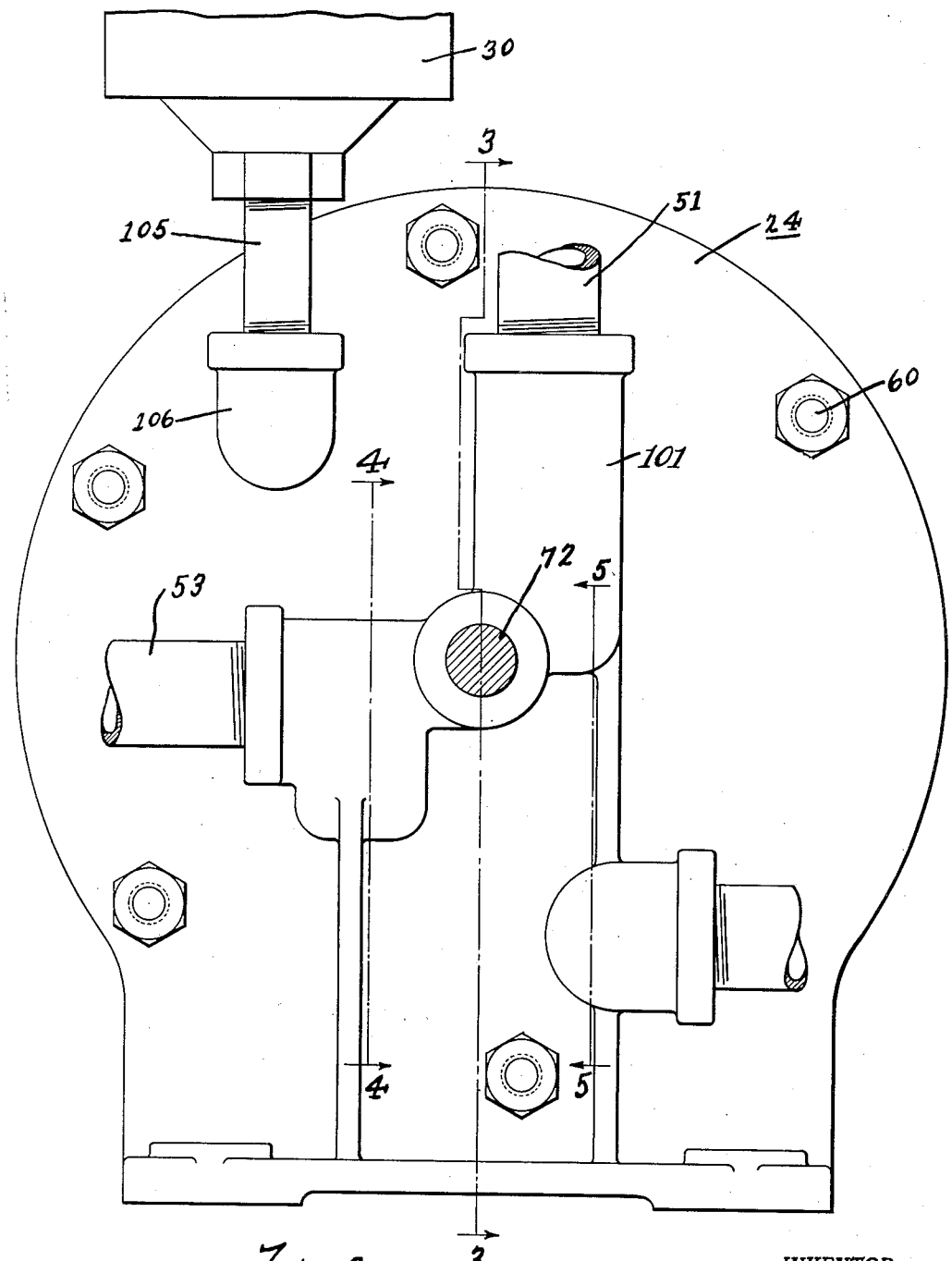
Fig. 2 is an enlarged view of a portion of the apparatus shown in Fig. 1.
Figure 3:
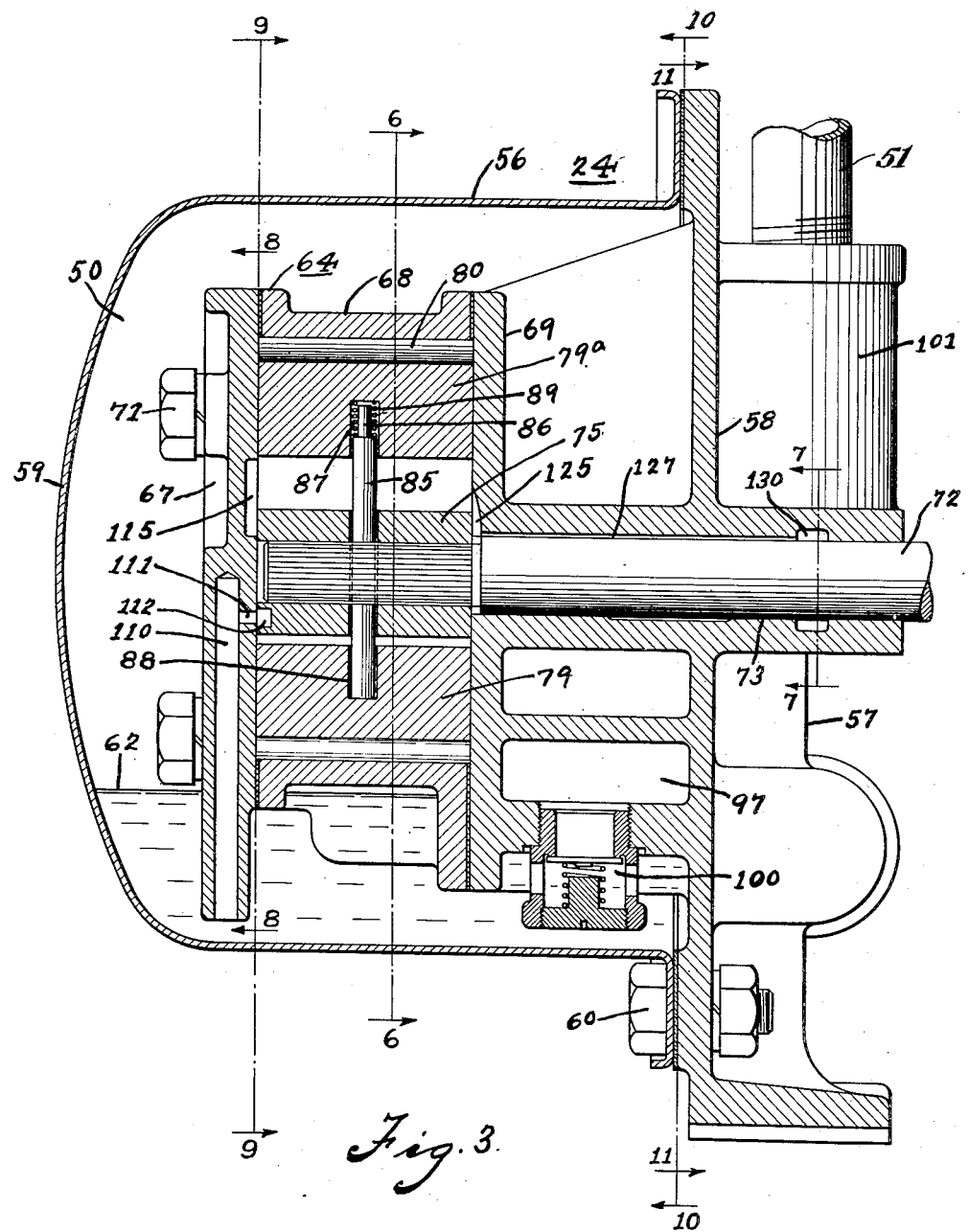
Fig. 3 is a view in cross section taken along the line 3—3 of Fig. 2.

This invention may be embodied in a system or carburetor 20 utilizing a fluid under pressure. The system includes apparatus 21 for maintaining the fluid under predetermined pressure limits in said system. The apparatus or compressing mechanism 21 includes a compressor 24 operatively connected with an electric motor 25 by belt 26. The apparatus 21 for maintaining the fluid under predetermined pressure limits within the system also includes a pressure responsive switch 30 connected to the system, for instance, near the apparatus 21 for controlling the operation of the compressor.

When the system is a carburetor, as shown in Fig. 1, a quantity of high grade liquid fuel is introduced into tank 35 through a feed pipe 36. Air in the form of a stream is contacted with the high grade fuel in the tank 35. The stream of air is produced by means of a perforated pipe 40 placed near the bottom of the tank 35. The air laden with the proper amount of hydrocarbons is withdrawn through a pipe 41, and may have its pressure reduced, if necessary, by means of an automatic pressure reducing valve 42, which discharges the carbureted air at a substantially constant pressure through a pipe 45 leading to suitable appliances such as household gas stoves having the usual type of burners used with this type of apparatus, water heaters, small industrial gas burners and the like. For ordinary household use, the gas in the pipe 45 may be maintained at a substantially constant pressure of four ounces by means of the pressure reducer or regulator 42.

Air is supplied to the pipe 40 at a substantially constant pressure by the apparatus 21. Thus the compressor 24 is provided with a connection to the pipe 40, which connection includes an air storage space 50 within the compressor casing and a pipe connection 51. The compressor may have its inlet 53 extended to the outside of the building in which the apparatus 21 is located. Preferably the tank 35 may also be placed outside of the building which is to be supplied with gas. Also, if desired, the tank 35 may be buried under ground and may be provided with the inlet connection 36 leading to the top of the ground and, if desired, a liquid level gauge (not shown) may be placed in the connection 36. Either the pipe 41 or pipe 45 may be laid into the building which is to be supplied with gas.

Referring more in detail to the drawings, the compressor 24 as shown is a rotary compressor and includes casing 56 formed preferably by a casting 57 having a vertical plate or wall 58 to which is secured a laterally extending dome 59 by bolts 60. The casing 56 provides a reservoir for lubricating oil 62 and a storage space for compressed air above the level of said lubricating oil. Within the casing 56 is disposed a housing 64 which encloses the compressing mechanism of the compressor. The housing 64 is formed preferably of an end plate 67, center section 68 and an end portion 69 formed by the casting 57, the end plate 67, center section 68 and end portion 69 being secured together by screws 71 passing through the members 67, 68 and screw threaded into the member 69. The compressor also includes a rotating shaft 72 journaled in a bearing 73 provided in casting 57. The shaft 72 extends within the housing 64 for actuating the compressing mechanism. The compressing mechanism includes a rotor 75 rigidly secured to the shaft 72. The rotor is adapted to rotate within a cavity 77 formed within the housing 64, preferably in the form of a true cylindrical bore. The rotor is provided with diametrically opposite sliding vanes 79 and 79a, which vanes are provided with contact bars 80 extending throughout the length of the vanes, said bars being provided with an arcuate portion conforming to the curvature of the bore 77. As shown in Fig. 6 the axis of the shaft 72 is eccentrically disposed with reference to the axis of the bore 77. Thus the vanes 79 and 79a are provided with a push rod 85 for maintaining the contact bars 80 in engagement with the walls of the cavity 77 at all times. The push rod 85 is provided with a reduced portion 86 surrounded by a spring 87 interposed between the vane 79a and a shoulder on the push rod. One end of the push rod 85 is slidably disposed within a bore 88 in the vane 79 while the reduced portion 86 and spring 87 is disposed within a bore 89 in vane 79a. Thus the spring 87 acts against the shoulder of the push rod 85 and against the vane 79a, thereby tending to force the contact bars 80 into engagement with the walls of the cavity 77 at all times. During rotation of the rotor, the end of the reduced portion of the push rod 85 will engage the vane 79a when said vanes are in a horizontal plane within the cavity to limit the inward movement of the vanes, the clearance between the push rod and the vane 79a being equal to the difference of the horizontal and the vertical distances across the bore 77 on a plane with the axis of the shaft 72. Thus it will be noted that the push rod 85 will cause the vanes 79 and 79a to slide within the recessed portions 79b of the rotor 75 during operation of the compressor and that the spring 87 cooperating with one of the vanes and the push rod 85 will maintain the contact bars in engagement with walls of the cavity 77.

The inlet 53 of the compressor 24 communicates with an inlet passage 90 formed by the casting 57 which communicates with inlet passages 91 and 92 formed in the rotor housing. As shown in Fig. 5 the compressing mechanism discharges into outlet passages 95 and 96 formed in the housing 64. The passage 96 communicates with a chamber 97 from whence the air is discharged below the level of lubricant through a check valve 100 which permits the flow of air therethrough but prevents return thereof. The pipe 51 is connected to an outlet 101 above the level of lubricant. Preferably a check valve 102 is provided which permits air to flow into the tank 35 but prevents return thereof. Should there be a slight leakage in the check valve 102, the return of liquid fuel is prevented by the action of the lubricating oil 62 on the check valve 100 which would form a liquid seal on said valve. Thus the film of oil will effectually seal the valve 100 to prevent return of fluid therethrough.

The compressor is operated so as to maintain substantially constant pressure within the casing 56. Thus the pressure switch 30 is connected by a pipe 105 to connection 106 formed by the casting 57, which connection communicates with the interior of the casing 56 through opening 107. The switch may be responsive to pressure within the system and is set to start and stop the motor 25 through the electrical conduit 110 in response to predetermined pressure limits within the system. Preferably these limits are two pounds when the motor starts and an upper limit of seven pounds when the motor stops. The pressure switch also includes an emergency or low pressure cut out position so that if the pressure within the tank 35 falls below the low pressure limit, in this case two pounds, the switch will render the compressor inoperative and in so doing will assume a position whereby the compressor will not be rendered operative until a manual reset (not shown) is actuated to cause the switch to assume the normal low operating pressure limit or closed circuit position. Thus, if for any reason the source of electricity which is connected to the motor should fail, so that the pressure within the tank 35 falls below two pounds, the switch will assume the emergency or low pressure cut out position to prevent the motor from starting again until the reset is manually actuated. This will prevent the carburetor from supplying carbureted air to the appliances after a failure of the source of electricity. This is advantageous for the reason that it would be dangerous to supply carbureted air after such appliances might become extinguished by reason of the failure of carbureted air supply. Further details of the pressure responsive switch 30 may be found in the copending application of Sidney W. Hetherington, Serial No. 405,258, filed November 6, 1929.

Thus it will be seen that the compressor is intermittently operated. Provision is made for lubricating the compressor during periods of operation. During the periods of operation, the space 50 in the casing is substantially at the same pressure as the tank 35. That is, it is at super-atmospheric pressure. This super-atmospheric pressure forces lubricating oil from the bottom of the casing 56 through a passage 110 and a passage 111 which communicates with a slot or chamber 112, provided in the rotor, only during operation of the rotor, and when the slot 112 aligns with passage 111. During rotation of the rotor, the oil received in the slot 112 will be discharged, by a wiping action and by centrifugal force, in a slot 115 provided in the end plate 67 when the slots 112 and 115 are in alignment. The oil discharged in the slot 115 will flow through the recessed portions 79b in which the vanes slide, and also some oil will be deposited in the cavities 120 formed in the rotor. The oil deposited in the cavities 120 will tend to work its way by a wiping action into the cavity 77, between the rotor and the end plate 67 to thus supply lubricant between the rotor and end plate 67. The oil flowing through the recessed portions 79b will supply lubricant to the sliding vanes and push rod 85 which slides through the shaft 72. After the oil leaves the recessed portion 79b, the compressing mechanism will carry the oil into a slot 125, a groove 127 provided in the bearing 73 over the shaft 72 and an annular chamber 130. The oil in the chamber 130 is drawn into the inlet of the compressor through a passage 135. By this arrangement, the necessity of providing a stuffing box at the end of the bearing 73 to prevent the escape of oil is avoided since the suction created by the compressor tends to draw the oil in the chamber 130 into the inlet 90. The oil is then directed to the cavity 77 to lubricate the contact bars, and is later discharged along with the compressed air through the valve 100 below the level of the lubricant where the oil entrained with the air is separated therefrom. Lubricant is also supplied to the contact bars by the oil which works its way between the rotor and end plate 67 during operation of the compressor as previously described. Thus it will be noted that the shaft 72 and its bearing 73, vanes 79 and 79a and the recessed portions in which the vanes slide, push rod, cavity wall and contact bars are supplied with lubricating oil during operation of the compressor. During the periods of idleness of the compressor no oil is supplied to the compressor mechanism since it is necessary for the rotor to rotate to align the slot 112 with the passage 111 and then carry the oil to the slot 115 as previously described. During periods of idleness of the compressor it is impossible for the slot 112 to align with the passage 111 and with the slot 115, while the oil which has worked its way between the rotor and end plate 67 tends to seal the slight space between the rotor and end plate 67 to prevent oil from flowing through the passage 111 during any period of idleness of the compressor.

A preferred liquid fuel to be used in the tank 35 is described in the copending application of Ernest Dickey, Serial No. 439,418 filed March 27, 1930.

While the form of embodiment of the invention as herein disclosed, constitutes a preferred form, it is to be understood that other forms might be adopted, all coming within the scope of the claims which follow.

What is claimed is as follows:

1. In a compressor, the combination with a casing having inlet and outlet ports and forming a reservoir for lubricant and a compressed fluid storage space, of a housing within said casing having a fluid inlet communicating with said casing inlet, and compressing means within said housing having outlet means for discharging the compressed fluid within said casing below the level of lubricant in said reservoir, a check valve in said outlet means for maintaining said casing under compression pressure and said inlet port under suction pressure, said housing being provided with a lubricant passage below the level of lubricant and leading to said compressing means, the pressure in said casing forcing lubricant to said compressing means during the operation of said means, said compressing means having a rotary lubricant transferring pocket operable with said compressing means and forming a seal to prevent the flow of lubricant through said passage during periods of idleness of the compressing means.

2. In a compressor, the combination with a casing having inlet and outlet ports and forming a reservoir for lubricant and a compressed fluid storage space, of a housing within said casing having a fluid inlet communicating with said casing inlet, compressing means within said housing having outlet means for discharging the compressed fluid within said casing below the level of lubricant in said reservoir, a check valve in said outlet means for maintaining said casing under compression pressure and said inlet port under suction pressure, a rotating shaft journaled in a bearing provided in said casing and extending within said housing for actuating said compressing mechanism, a groove in said bearing, said housing being provided with a passage below the level of lubricant and leading to said compressing means, the pressure in said casing forcing lubricant to said compressing means during the operation of said means, and means responsive to the operation of said compressing means for carrying lubricant to said groove, said compressing means having a rotary lubricant transferring pocket operable with said compressing means and forming a seal to prevent the flow of lubricant through said passage during periods of idleness of the compressing means.

3. In a compressor, the combination with a casing having inlet and outlet ports and forming a reservoir for lubricant and a compressed fluid storage space, of a housing within said casing having a fluid inlet communicating with said casing inlet, compressing means within said housing having outlet means for discharging the compressed fluid within said casing below the level of lubricant in said reservoir, a check valve in said outlet means for maintaining said casing under compression pressure and said inlet port under suction pressure, a rotating shaft journaled in a bearing provided in said casing and extending within said housing for actuating said compressing mechanism, a groove in said bearing, said housing being provided with a passage below the level of lubricant and leading to said compressing means, the pressure in said casing forcing lubricant to said compressing means during the operation of said means, and means responsive to the operation of said compressing means for carrying lubricant to said groove, said groove communicating with the inlet provided in said casing whereby the suction created by the compressing means tends to draw the lubricant from said groove into said inlet during the operation of said compressing means, said compressing means having a rotary lubricant transferring pocket operable with said compressing means and forming a seal to prevent the flow of lubricant through said passage during periods of idleness of the compressing means.

4. In a compressor having high pressure and low pressure sides, the combination with a housing, compressing mechanism within said housing, means on the high pressure side forming a reservoir for lubricant, means forming a passage from said reservoir to said compressing mechanism, the pressure on the high pressure side forcing lubricant to said compressing mechanism, and a lubricant transferring pocket connected alternately with only the high pressure side or the low pressure side at one time by the operation of said compressing mechanism for carrying said lubricant to the low pressure side of said compressor only during said operation.

5. In a compressor having high pressure and low pressure sides, the combination with a housing, compressing mechanism within said housing, means on the high pressure side forming a reservoir for lubricant, means forming a passage from said reservoir to said compressing mechanism, the pressure on the high pressure side forcing lubricant to said compressing mechanism, and a lubricant transferring pocket connected alternately with only the high pressure side or the low pressure side at one time by the operation of said compressing mechanism for carrying said lubricant to the low pressure side of said compressor, the suction created by said compressor returning said lubricant to said compressing mechanism.

CLARENCE WARNER.